F. SCHONGER.
ANTIFROSTING DEVICE.
APPLICATION FILED MAR. 7, 1917.
1,228,482.
Patented June 5, 1917.
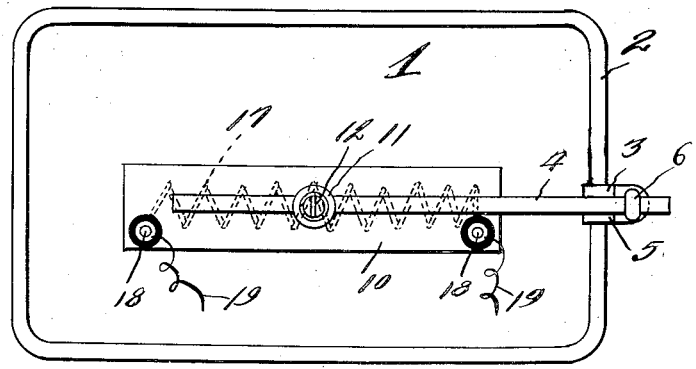
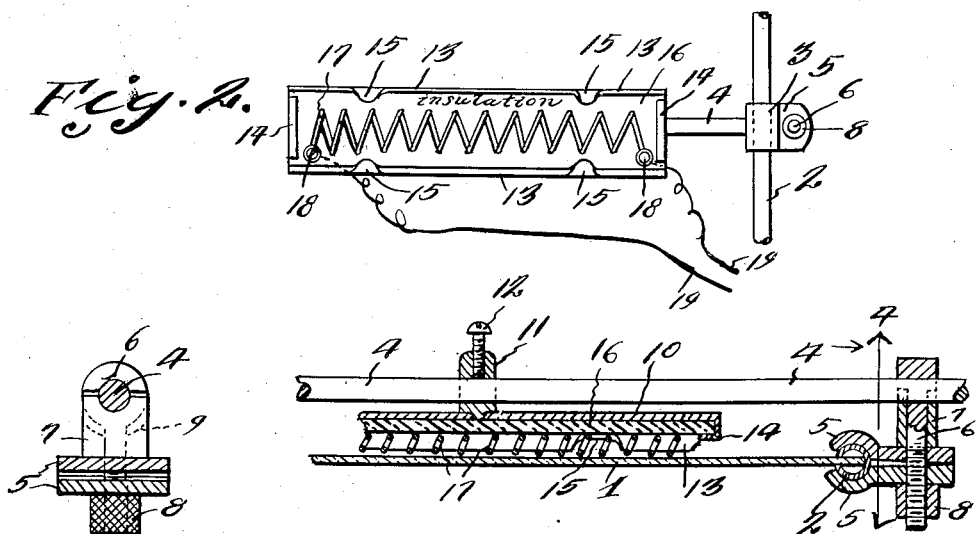

UNITED STATES PATENT OFFICE.

FRANK SCHONGER, OF KINGSTON, NEW YORK.

ANTIFROSTING DEVICE.

1,228,482.   Specification of Letters Patent.   Patented June 5, 1917.

Application filed March 7, 1917. Serial No. 153,103.

*To all whom it may concern:*

Be it known that I, FRANK SCHONGER, a citizen of the United States, residing at Kingston, in the county of Ulster, State of New York, have invented a new and useful Antifrosting Device; and I do hereby declare the following to be a full, clear, and exact description of the invention, such as will enable others skilled in the art to which it appertains to make and use the same.

The invention is an anti-frosting device designed for use on the wind shields of automobiles, front windows of street cars, or other places where such a device is serviceable.

The principal object is to provide a means for keeping wind shields or car windows free from frost or moisture that would obstruct the view through them.

A further object is to provide, in such a device, means that will permit it to be shifted to various different positions on the window or shield to which it is applied.

A further object is to provide a novel means for supporting the device on a wind shield.

Other objects will appear from the detailed description of this device which is to follow.

The drawings set forth a specific embodiment of the invention to which, however, it is not to be restricted. The right is reserved to vary the details of this embodiment to any extent permitted by the scope of the appended claim.

In illustrating this invention, no pretense is made to correct proportion. Practical trials have shown that the device itself may be comparatively small with respect to the wind shield or window which it is to protect from frost. As shown on the drawings, the device is disproportionally large with respect to the wind shield to which it is attached, but has been made so to more clearly illustrate the device.

A uniform system obtains throughout the drawings for designating the various parts in the several figures.

Figure 1 is a plan of the invention, showing it applied to the conventional wind shield.

Fig. 2 is also a plan view, but shows the device viewed from the opposite side, the glass being omitted.

Fig. 3 is a central longitudinal sectional view.

Fig. 4 is a section on the line 4—4 of Fig. 3.

The numeral 1 represents a conventional wind shield having the surrounding frame 2. The clamp 3 is adapted for attachment to the frame 2, this clamp supporting the rod 4. The clamp comprises two members 5, the eye bolt 6, the sleeve member 7 and knurled nut 8. The eye bolt 6 is adapted to receive the rod 4 in its eye and has the upper half of its head thicker than its shank and the lower half of its head. The sleeve member 7, in plan, has the same outline as the upper half of the head of the eye bolt and has a central longitudinal hole through which the shank of the eye bolt 6 passes. The sleeve 7, on either side of the hole has semicircular depressions in which the rod 4 is designed to rest and also has a slot 9 to permit the lower half of the head of the eye bolt 6 to enter it. The members 5 have curved ends which are adapted to encircle the frame 2, the straight extensions of these curved ends being provided with holes through which the shank of the eye bolt 6 passes.

As shown in Fig. 3, when the members 5 are so positioned that their curved ends encircle the frame 2, the nut 8 may be tightened by screwing it up on the shank of the eye bolt 6. This operation causes the head of the eye bolt to press down on the rod 4 which in turn presses on the sleeve member 7 causing the latter to press upon one of the members 5, the other member 5 being pressed upon by the knurled nut 8. The screwing up of the nut 8 thus operates to secure the rod 4 to the clamp 3 and the clamp 3 to the frame 2.

The rod 4 attaches to a post 11 which has a diametrically disposed hole to engage the rod in sliding relation thereto, a screw 12 being provided to secure the post to the rod when the desired position of the post on the rod has been obtained. A plate 10 is fixed to the post 11 by any suitable method of attaching it thereto. The sides and ends of the plate 10 are turned at right angles to its body forming the flanges 13 and 14. A suitable insulating plate 16 rests between the flanges 13 and 14, the flanges 14 being turned down upon this insulation 16 to hold it in place. Depressions 15 are made also in the flanges 13 to further secure the insulation 16. A suitable heating coil 17 rests upon the insulation 16 and is connected between the binding posts 18, these binding posts passing through the plate 10 and being suitably insulated therefrom. Conducting wires 19 connect with the binding posts 18 and operate to transmit electric current (from any suitable means of supply) to the heating coil 17.

The device operates by keeping the wind shield (to which it is applied) heated, so that frost cannot accumulate thereon, the heat being obtained by electric current. It will be seen that the clamp 3 can be shifted in position on the frame 2 and that the rod 4 can have its position changed with respect to the clamp. Therefore, the heating member can be shifted to any desired position on the wind shield to keep any desired portion of the latter free from frost.

The advantage of providing means for shifting the device to various positions on the wind shield is apparent, when it is remembered that in extreme weather the device may not be able to radiate enough heat to keep all the wind shield free from frost. Under such conditions the device can be positioned to keep a certain definite area clear to permit an unobstructed view to the driver.

The device may be applied in any other case where anti-frosting means is serviceable, such as street car windows and the like, a supporting rod being positioned, so that the clamp 3 may be conveniently applied thereto.

What is claimed is:

In an anti-frosting device, a heating coil, a supporting plate for the heating coil, a post attached to said plate, a rod connected with said post, and a clamp connected with said rod, the post having means for changing the position of the plate and the heating coil with respect to the rod, the clamp having means for securing it to the wind shield and for simultaneously securing the rod to it, the clamp being further provided with means to permit the position of the rod to be varied longitudinally or angularly with respect to it.

In testimony whereof I have signed my name to this specification in the presence of two subscribing witnesses.

FRANK SCHONGER.

Witnesses:
ROBT. B. VAN GAASBEEK,
WM. R. KRAFT.